United States Patent [19]

Jensen

[11] 4,301,901
[45] Nov. 24, 1981

[54] COMBINED FOOT BRAKE AND PARKING BRAKE

[75] Inventor: Louis T. Jensen, Terre Haute, Ind.

[73] Assignee: J.I. Case Company, Racine, Wis.

[21] Appl. No.: 133,369

[22] Filed: Mar. 21, 1980

[51] Int. Cl.³ ............................................. B60K 41/26
[52] U.S. Cl. ..................................................... 192/4 C
[58] Field of Search ................ 192/4 A, 4 C; 74/477, 74/473 R, 481

[56] References Cited

U.S. PATENT DOCUMENTS

| | | | |
|---|---|---|---|
| 2,018,469 | 10/1935 | Roehrl | 192/4 A |
| 2,821,275 | 1/1958 | Martin | 192/4 A |
| 3,710,904 | 1/1973 | Boyer | 192/4 A |

*Primary Examiner*—George H. Krizmanich
*Attorney, Agent, or Firm*—Cullen, Sloman, Cantor, Grauer, Scott & Rutherford

[57] ABSTRACT

A combined foot brake and parking brake mechanism is disclosed which is particularly useful for machines having a hydrostatic transmission, such as a tractor. The combined brake mechanism includes a foot brake for normal braking operation and a parking brake mechanism which is connected to the foot brake. The parking brake mechanism is also functionally connected to the transmission shift arm such that the parking brake cannot be engaged unless the transmission shift arm is in its neutral position, and the parking brake must be released before the hydrostatic transmission can be actuated by the shift arm from neutral into forward or reverse. The parking brake mechanism includes a pivotal lock arm assembly that may be selectively pivoted into locking engagement with the transmission shift arm when the shift arm is in its neutral position only. The lock arm assembly is pivoted at one end by a control lever assembly which has two detent positions. One detent position being used to hold the lock arm assembly engaged with the transmission shift arm, and the other detent position holding the lock arm assembly in a disengaged position. The other end of the lock arm assembly is connected to the ratchet pawl of the parking brake latch mechanism so that when the lock arm assembly is pivoted into locking engagement with the transmission shift arm, the ratchet pawl is simultaneously forced into engagement with the rack of the parking brake latch mechanism. Thereafter, the foot brake pedal may be depressed to any desired point for tensioning the brake cable, and it will be held in the desired position by the engagement between the ratchet pawl and rack of the parking brake latch mechanism.

5 Claims, 3 Drawing Figures

COMBINED FOOT BRAKE AND PARKING BRAKE

BACKGROUND OF THE INVENTION

The present invention relates to machines having a hydrostatic transmission, such as a tractor, and more particularly, to a combined foot brake and parking brake mechanism for the machine which is interconnected with the hydrostatic transmission shift arm.

It is conventional to provide tractors and similar machines with hydrostatic transmissions for controlling the speed, direction, and pulling power of the tractor. The transmission is provided with a rotatable shift arm or lever which may be rotated in one direction for forward motion of the tractor and in the opposite direction for rearward or reverse motion. The speed of the tractor is proportional to the rotation of the shift arm while the tractor engine is operated at a speed set by a conventional throttle device.

Tractors of this type generally do not include a parking brake or brake pedal. The tractor is held on an incline by slightly advancing the hydrostatic transmission shift arm in forward or reverse. When the transmission shift arm is set at neutral, the tractor may roll down an incline. If the tractor is provided with a parking brake, the brake may be accidentally left engaged when the hydrostatic transmission is actuated into forward or reverse, wearing or possibly damaging the brake.

This problem is solved in the combined foot brake and parking brake mechanism of this invention, by functionally connecting the parking brake mechanism to the transmission shift arm, such that the parking brake cannot be engaged unless the transmission shift arm is in its neutral position. Further, the parking brake mechanism must be released before the hydrostatic transmission can be acutated by the shift arm from neutral into forward or reverse. The combined foot brake and parking brake mechanism of this invention is relatively simple and mechanically actuated to reduce the chances of failure.

SUMMARY OF THE INVENTION

As described above, the combined brake mechanism of this invention is particularly adapted to machines having a hydrostatic transmission, such as a tractor, and permits the use of a parking brake or similar foot pedal actuated brake. The transmission control may include a shift arm or lever rotatable in opposite directions from a neutral position to control the input to the hydrostatic transmission. The combined brake conrol in the disclosed embodiment includes a foot brake pedal and control arm or lever rotatable about a pivot axis and a brake cable connected to the brake control arm, spaced from the pivot axis. Thus, rotation of the foot brake control arm tensions the brake cable to selectively actuate the brake as conventionally understood for normal braking operations. The brake assembly also includes a parking brake latch mechanism consisting of a rack and ratchet pawl, which releasably retains the brake control arm with the brake cable tensioned, to hold the brake in the brake position when the machine is parked.

The parking brake mechanism further includes a pivotal lock arm assembly that may be selectively pivoted into locking engagement with the transmission shift arm when the shift arm is in its neutral position only. The lock arm assembly is pivoted at one end by a control lever assembly which has two detent positions. One detent position being used to hold the lock arm assembly engaged with the transmission shift arm, and the other detent position holding the lock arm assembly in a disengaged position. The other end of the lock arm assembly is connected to the ratchet pawl of the parking brake latch mechanism so that when the lock arm assembly is pivoted into locking engagement with the transmission shift arm, the ratchet pawl is simultaneously forced into engagement with the rack of the parking brake latch mechanism.

Thereafter, the foot brake pedal may be depressed to any desired point for tensioning the brake cable, and it will be held in the desired position by the engagement between the ratchet pawl and rack of the parking brake latch mechanism. The parking brake is released by pivoting the lock arm assembly to its disengaged position which forces the ratchet pawl out of engagement with the rack of the parking latch brake mechanism.

In the preferred embodiment of the parking brake mechanism, the control lever assembly includes a hand operated lever arm which is fixed to a rotatable rod member such that the longitudinal axis of the lever arm is perpendicular to the longitudinal axis of the rod member. The rod member includes a detent pin which projects radially from its periphery, and the rod member is rotatably mounted in a detent collar, which is fixed. The detent pin, rod member, and hand lever are spring biased so that the detent pin selectively engages either first or second detent recesses in the fixed collar. The first detent position holds the lock arm assembly in its disengaged location, and the second detent position holds the lock arm assembly in its locked or engaged position with the transmission shift arm.

During normal operation with the transmission shift arm in either its forward or reverse position, the operator depresses the foot brake pedal when braking is desired as is conventional. When it is desired to operate the parking brake mechanism, the transmission shift arm is first rotated to its neutral position. Then, the hand operated lever arm is pulled and rotated which pivots the lock arm assembly into engagement with the transmission shift arm and simultaneously causes the engagement of the ratchet pawl with the rack of the parking brake latch mechanism. When the parking brake mechanism is engaged, the foot brake pedal may be depressed to any desired point for tensioning the brake cable. The lock arm assembly can not be engaged with the transmission shift arm in its forward or reverse position because of interference from the shift arm.

The combined foot and parking brake mechanism of the present invention thus permits the use of a foot actuated brake on a machine having a hydrostatic transmission, such as a tractor. The parking brake mechanism is functionally connected to the transmission shift arm, such that the parking brake cannot be engaged unless the transmission shift arm is in its neutral position. Other advantages and meritorious features of the present invention will be more fully understood from the following description of the preferred embodiment, the appended claims, and the drawings, a brief description of which follows.

DESCRIPTION OF THE PREFERRED EMBODIMENT

Figure 2:
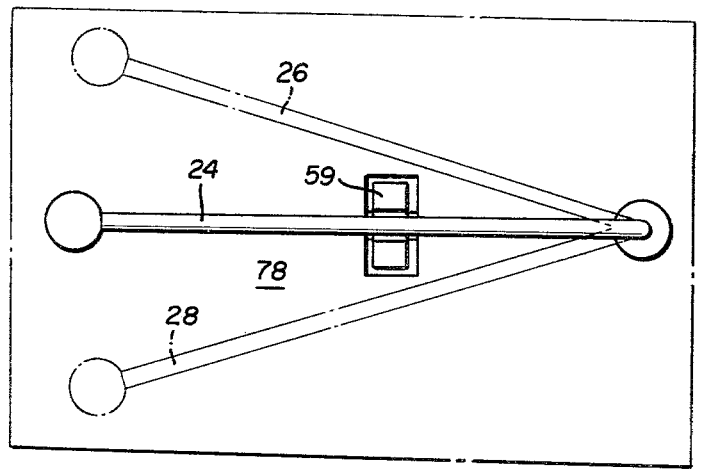
FIG. 2 is a partial top view of the combined brake mechanism illustrating the transmission shift arm and lock arm assembly.
Figure 1:
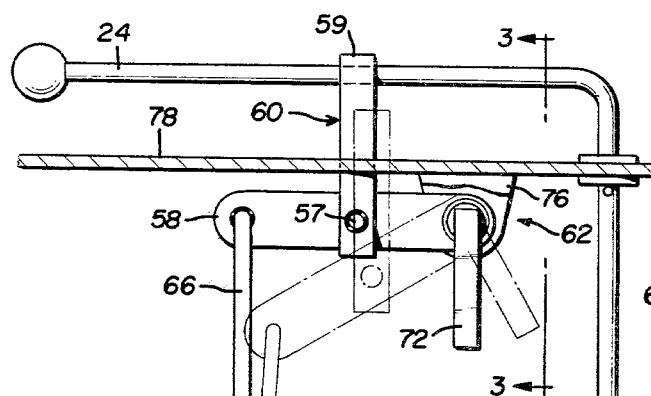
FIG. 1 is a side elevation of the combined foot brake and parking brake mechanism of the present invention.
Figure 3:
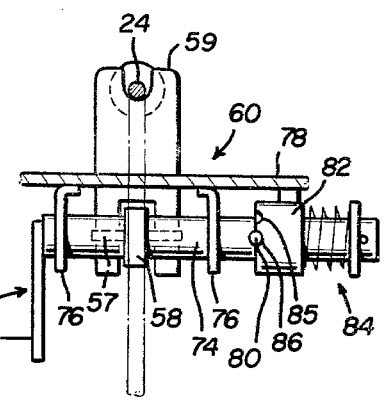
FIG. 3 is a cross sectional view taken along line 3—3 of FIG. 1.

As previously described, the combined foot brake and parking brake mechanism of this invention permits the use of a foot actuated brake mechanism, such as shown at 20 in FIG. 1, in a tractor or the like, having a hydrostatic transmission. In the disclosed embodiment, the hydrostatic transmission (not shown) is actuated by a shift arm or lever 22 having a hand operated end 24. The arm may be rotated clockwise or counterclockwise to actuate the transmission in forward or reverse, respectively. As shown in FIGS. 1 and 2, the handle 22 is in the neutral position. If the handle is rotated in a clockwise direction, as shown in phantom at 26 in FIG. 2, the transmission will move the tractor forwardly. If the shift lever 22 is rotated counterclockwise, as shown in phantom at 28 in FIG. 2, the transmission will move the tractor rearwardly.

In the disclosed embodiment, the foot brake mechanism 20 includes a brake lever or arm 30 which supports a foot pedal 32. Brackets 34 are welded or otherwise secured to the support plate 36 and the transverse pivot pin 38 pivotally supports the brake lever. The brake cable 40 is pivotally supported at the lower end of the brake lever by clevis 42 and pivot pin 44. Thus, if the brake pedal 32 is depressed, the brake lever or arm 30 will be rotated in a counterclockwise direction, tensioning brake cable 40. As will be understood by those skilled in the art, tensioning of the brake cable will actuate a conventional type brake.

In the disclosed embodiment, the combined foot brake and parking brake mechanism includes a parking brake latch mechanism 45 consisting of a vertically movable rack 46 having conventional spaced ratchet teeth 48. Rack 46 is mounted at one of its ends to brake lever 30 by pivot pin 44. The depression of foot pedal 32 causes rack 46 to move vertically upward through opening 21 in support plate 23. Parking brake latch mechanism 45 also consists of a ratchet pawl 50 having a nose 52 selectively engageable with rack teeth 48. Brackets 54 are welded or otherwise secured to support plate 23 and the transverse pivot pin 55 pivotally supports ratchet pawl 50. Ratchet pawl 50 is spring biased counterclockwise by ratchet disengage spring 56 so that during normal braking operations, it remains out of engagement with rack teeth 48 as shown in phantom lines in FIG. 1. The ratchet pawl 50 may, however, be locked in the parking brake position by lock arm assembly 60, as now described.

The parking brake mechanism includes a pivotal lock arm assembly 60 consisting of lever 58 and lock arm 59 which is pivotally mounted to the lever by pivot pin 57. Lock arm 59 may be selectively pivoted into locking engagement with the transmission shift arm 22 when the shift arm is in its neutral position only, as shown in FIGS. 1 and 2. The lock arm assembly 60 is pivoted at one end by a control lever assembly 62 which has two detent positions. One detent position being used to hold the lock arm 59 engaged with the transmission shift arm 22 as seen in the solid line position of FIG. 1, and the other detent position holding the lock arm assembly in a disengaged position as shown by the phantom line position of FIG. 1.

The other end of the lock arm assembly 60 is connected to the ratchet pawl 50 of the parking brake latch mechanism by actuating linkage 64 consisting of rod 66, ratchet spring 67, rod 68, and pivot pin 70. When the lock arm assembly 60 is pivoted into locking engagement with the transmission shift arm 22, the ratchet pawl 50 is simultaneously forced into engagement with the rack 46 of the parking brake latch mechanism 45. Thereafter, the foot brake pedal 32 may be depressed to any desired point for tensioning the brake cable 40, and it will be held in the desired position by the engagement between the ratchet pawl 50 and rack teeth 48 of the brake latch mechanism 45. The parking brake is released by pivoting the lock arm assembly 60 to its disengaged position which forces ratchet pawl 50 out of engagement with rack 46.

In the preferred embodiment of the parking brake mechanism, the control lever assembly 62 includes a hand operated lever arm 72 which is fixed to a rotatable rod member 74 such that the longitudinal axis of the lever is perpendicular to the longitudinal axis of the rod member. Brackets 76 are welded or otherwise secured to support plate 78, and rod member 74 is rotatably supported by brackets 76. Rod member 74 supports pivotal lever 58 of the lock arm assembly 60, and it includes detent pin 80 which projects radially from its periphery. Member 74 is rotatably mounted within a detent collar 82 which is fixed to support plate 78. The detent pin 80, rod member 74, and hand operated lever 72 are spring biased by spring assembly 84 so that the detent pin 80 selectively engages first or second detent recesses 85,86 in the fixed collar 82. The first detent position 85 holds the lock arm assembly 60 in its disengaged location (phantom lines, FIG. 1), and the second detent position 86 holds the lock arm assembly in its locked or engaged position with the transmission shift arm 22.

During normal operation with the transmission shift arm in either its forward or reverse position, the operator depresses foot brake pedal 32 when braking is desired as is conventional. When it is desired to operate the parking brake mechanism, the transmission shift lever is first rotated to its neutral position as shown in FIG. 1. Then, the hand operated lever arm 72 is pulled and rotated which pivots the lock arm 59 into engagement with the transmission shift arm 22 and simultaneously causes the engagement of ratchet pawl 50 with rack teeth 48. Lock arm 59 is bifurcated at one end to lockingly engage transmission shift arm 22. The lock arm 59 cannot be engaged with the transmission shift arm when it is in its forward or reverse position because of the interference between the shift arm 22 and the bifurcated end of lock arm 59. When the parking brake mechanism is engaged, the foot brake pedal 32 may be depressed to any desired point for tensioning the brake cable 40, and it is held in that position by the engagement between ratchet pawl 50 and rack 46.

It will be apparent to those skilled in the art that the foregoing disclosure is exemplary in nature rather than limiting, the invention being limited only by the appended claims.

I claim:

1. A combined brake actuating mechanism for a machine having a brake and hydrostatic transmission, a transmission shift means rotatable about one axis into forward, reverse, and neutral operating positions to control the input to said hydrostatic transmission, said combined brake actuating mechanism comprising:

brake control means including a brake control arm rotatable about a pivot axis, and a brake cable connected to said control arm spaced from said pivot axis, the rotation of said brake control arm tensioning said brake cable to actuate said brake;

parking brake latch means connected to said control arm, and said latch means being movable from a disengaged position to an engaged position for relesably retaining said brake cable tensioned to lock said brake;

a pivotal lock arm assembly connected to said parking brake latch means, control lever means connected to said pivotal lock arm assembly for selectively pivoting said lock arm assembly in a first direction into locking engagement with said transmission shift arm when said shift arm is in its neutral position only, said parking brake latch means being simultaneously moved into its engaged position in response to pivotal movememt of said lock arm assembly in said first direction for retaining said brake cable tensioned to lock said brake.

2. The combined brake actuating mechanism as defined in claim 1 wherein said parking brake latch means includes a rack member and a rotatable ratchet pawl, said rack member pivotally mounted to said brake control arm and said ratchet pawl connected to said pivotal lock arm assembly, said ratchet pawl being rotatable from a disengaged position away from said rack member to an engaged position with said rack member in response to pivotal movement of said lock arm assembly in said first direction for releasably retaining said brake cable tensioned to lock said brake.

3. The combined brake actuating mechanism as defined in claim 2 wherein said control lever means includes a hand operated lever means which is fixed to a rotatable support member, said lock arm assembly being mounted to said rotatable support member, detent means engageable with said support member to selectively hold said lock arm assembly in an engaged position with said transmission shift arm to hold said lock arm assembly in a disengaged position away from said transmission shift arm.

4. The combined brake actuating mechanism as defined in claim 3 wherein said rotatable support member includes a detent pin, said detent means comprises a detent collar having first and second detent recesses, said support member being rotatable in said collar, spring means mounted to said detent collar for biasing said detent pin into a selected one of said detent recesses in said detent collar thereby releasably holding said lock arm assembly in either its engaged or disengaged position.

5. The combined brake actuating mechanism as defined in claim 1 wherein said lock arm assembly includes a lock arm having a bifurcated end portion for locking said transmission shift arm when said shift arm is in its neutral position only.

* * * * *